US011573826B2

United States Patent
Seino et al.

(10) Patent No.: US 11,573,826 B2
(45) Date of Patent: Feb. 7, 2023

(54) CONTROL SYSTEM, CONTROL METHOD, AND PROGRAM

(71) Applicant: HONDA MOTOR CO., LTD., Tokyo (JP)

(72) Inventors: Kohei Seino, Wako (JP); Shingo Ito, Wako (JP); Yasuhiro Okuno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 466 days.

(21) Appl. No.: 16/629,320

(22) PCT Filed: Aug. 10, 2017

(86) PCT No.: PCT/JP2017/029089
§ 371 (c)(1),
(2) Date: Jan. 8, 2020

(87) PCT Pub. No.: WO2019/030897
PCT Pub. Date: Feb. 14, 2019

(65) Prior Publication Data
US 2021/0141669 A1 May 13, 2021

(51) Int. Cl.
*G06F 9/00* (2006.01)
*G06F 9/48* (2006.01)
(Continued)

(52) U.S. Cl.
CPC ............. *G06F 9/4893* (2013.01); *B60Q 9/00* (2013.01); *B60R 16/03* (2013.01); *G05B 15/02* (2013.01);
(Continued)

(58) Field of Classification Search
CPC . G06F 9/4893; G06F 1/26; G06F 8/65; G06F 9/442; B60Q 9/00; B60R 16/03;
(Continued)

(56) References Cited

U.S. PATENT DOCUMENTS

| 2002/0033155 A1* | 3/2002 | Jung | F02D 41/062 |
| | | | 123/145 A |
| 2002/0109407 A1* | 8/2002 | Morimoto | B60L 50/16 |
| | | | 903/917 |

(Continued)

FOREIGN PATENT DOCUMENTS

| JP | 2000-326804 | 11/2000 |
| JP | 2004-236472 | 8/2004 |

(Continued)

OTHER PUBLICATIONS

International Search Report and Written Opinion for International Application Serial No. PCT/JP2017/029089 dated Sep. 12, 2017, 8 pages.

*Primary Examiner* — Volvick Derose
(74) *Attorney, Agent, or Firm* — Amin, Turocy & Watson, LLP (57) ABSTRACT

A control system includes a management unit configured to control a power supply device toward a target value for an output performance value of the power supply device that supplies power to a predetermined device, and an acquisition unit configured to acquire information related to a post-shutdown task scheduled to be executed after a shutdown condition of the predetermined device is satisfied, in which the management unit refers to the information acquired by the acquisition unit, and, when the post-shutdown task is scheduled to be executed, sets the target value to a second target value which is higher than a first target value set when the post-shutdown task is scheduled to be executed, before the shutdown condition is satisfied.

12 Claims, 5 Drawing Sheets

(51) Int. Cl.
  *H02J 13/00* (2006.01)
  *B60Q 9/00* (2006.01)
  *B60R 16/03* (2006.01)
  *G05B 15/02* (2006.01)
  *G06F 1/26* (2006.01)
  *G06F 8/65* (2018.01)
  *G06F 9/4401* (2018.01)

(52) U.S. Cl.
  CPC .................. *G06F 1/26* (2013.01); *G06F 8/65* (2013.01); *G06F 9/442* (2013.01); *H02J 13/00002* (2020.01); *H02J 13/00022* (2020.01)

(58) Field of Classification Search
  CPC ................ G05B 15/02; H02J 13/00002; H02J 13/00022; H02J 7/00; H02J 7/14
  USPC .......................................................... 713/102
  See application file for complete search history.

(56) References Cited

U.S. PATENT DOCUMENTS

| | | | | |
|---|---|---|---|---|
| 2003/0217559 A1* | 11/2003 | Ieda | .................. | H01M 8/04604 62/230 |
| 2007/0095131 A1* | 5/2007 | Takayama | .............. | F02M 26/49 73/114.61 |
| 2007/0108936 A1* | 5/2007 | Yaguchi | .................. | B60L 50/51 318/800 |
| 2009/0294193 A1* | 12/2009 | Okuno | .................. | B60W 20/13 180/65.265 |
| 2010/0327961 A1* | 12/2010 | Ikenaga | ............. | H03K 19/0016 327/540 |
| 2012/0210150 A1* | 8/2012 | de Lind van Wijngaarden | | .......... G06F 9/4893 713/320 |
| 2013/0246815 A1* | 9/2013 | Uehara | .................. | G06F 1/3203 713/300 |
| 2014/0025974 A1* | 1/2014 | Suwabe | ............. | H04N 1/00896 713/323 |
| 2014/0132063 A1* | 5/2014 | Kakiuchi | ................ | B60R 16/03 307/9.1 |
| 2015/0035486 A1* | 2/2015 | Yamaguchi | ............... | B60L 3/12 320/109 |
| 2015/0258911 A1* | 9/2015 | Sugiyama | ............... | B60L 58/20 903/903 |
| 2017/0031816 A1* | 2/2017 | Lee | ......................... | G06F 3/061 |

FOREIGN PATENT DOCUMENTS

| | | |
|---|---|---|
| JP | 2009-286254 | 12/2009 |
| WO | 2012-109048 | 8/2012 |

* cited by examiner

CONTROL SYSTEM, CONTROL METHOD, AND PROGRAM

TECHNICAL FIELD

The present invention relates to a control system, a control method, and a program.

BACKGROUND

A technology of predicting the power consumption due to the tasks of an application executed in a terminal device and determining a schedule of the tasks is known (for example, Patent Literature 1).

CITATION LIST

Patent Literature

[Patent Literature 1]
PCT International Publication No. WO2012/109048

SUMMARY OF INVENTION

Technical Problem

However, in this conventional technology, securing power for tasks that are executed after the terminal device is shut down is not taken into consideration.

The present invention has been made in view of such a circumstance, and an object thereof is to provide a control system, a control method, and a program which can secure, even when there are tasks to be executed after the device is shut down, power required for the execution of the tasks.

Solution to Problem (1): A control system includes a management unit configured to control a power supply device toward a target value for an output performance value of the power supply device that supplies power to a predetermined device, and an acquisition unit configured to acquire information related to a post-shutdown task scheduled to be executed after a shutdown condition of the predetermined device is satisfied, in which the management unit refers to the information acquired by the acquisition unit, and, when the post-shutdown task is scheduled to be executed, sets the target value to a second target value which is higher than a first target value set when the post-shutdown task is not scheduled to be executed, before the shutdown condition is satisfied.

(2): In the control system according to (1), a task execution unit configured to execute the post-shutdown task when the output performance value of the power supply device reaches the second target value at a time at which the shutdown condition of the predetermined device is satisfied is further included.

(3): In the control system according to (1) or (2), the management unit predicts a time or point at which the shutdown condition of the predetermined device as a moving object is satisfied, and sets, when the predetermined device is present at a position of a predetermined time or a predetermined distance from the predicted time or point, the target value to the second target value.

(4): In the control system according to any one of (1) to (3), the management unit sets different second target values on the basis of content of the post-shutdown task scheduled to be executed after the shutdown condition of the predetermined device is satisfied.

(5): In the control system according to any one of (1) to (4), the post-shutdown task is a task including at least one of a task that acquires update data of a control program of the predetermined device, a task that updates the control program of the predetermined device using the update data, a task that acquires parameters used for processing in the predetermined device, and a task that updates the parameters used for the processing in the predetermined device.

(6): In the control system according to (5), a notification unit configured to notify a user of the predetermined device that the post-shutdown task is executed when the output performance value has reached the second target value is further included.

(7): In the control system according to (5) or (6), when the post-shutdown task is a task that acquires the update data using the acquisition unit and updates the control program based on the update data, the management unit sets the output performance value of the power supply device to a first value as the second target value, and sets the output performance value to a second value which is lower than the first value as the second target value when the post-shutdown task is a task that updates the control program based on the update data without acquiring the update data using the acquisition unit.

(8): In the control system according to any one of (1) to (7), the predetermined device is a moving object including a vehicle.

(9): In the control system according to any one of (1) to (8), the acquisition unit acquires the information while a second power supply device different from the power supply device performs power supply to the predetermined device, and the second power supply device stops the power supply to the predetermined device after the shutdown condition of the predetermined device is satisfied.

(10): A control method includes, by a computer, controlling a power supply device toward a target value for an output performance value of the power supply device that supplies power to a predetermined device, acquiring information related to a post-shutdown task scheduled to be executed after a shutdown condition of the predetermined device is satisfied, and referring to the acquired information and, when the post-shutdown task is scheduled to be executed, setting the target value to a second target value which is higher than a first target value set when the post-shutdown task is not scheduled to be executed, before the shutdown condition is satisfied.

(11): A program causes a computer to control a power supply device toward a target value for an output performance value of the power supply device that supplies power to a predetermined device, acquire information related to a post-shutdown task scheduled to be executed after a shutdown condition of the predetermined device is satisfied, and refer to the acquired information and, when the post-shutdown task is scheduled to be executed, set the target value to a second target value which is higher than a first target value set when the post-shutdown task is not scheduled to be executed, before the shutdown condition is satisfied.

Advantageous Effects of Invention

According to (1), (8), (10), and (11), even when there is a task to be executed after the predetermined device is shut down, it is possible to secure power required for execution of the task.

According to (2), when the predetermined device is started again by the power required for the execution of the task being ensured, it is possible to avoid lack of power required for restarting.

According to (3), the power required for the execution of the task is secured at a time at which the shutdown condition is satisfied, and thereby it is possible to avoid an increase in size of a storage battery for the power required for the execution of the task, and to avoid a decrease in fuel consumption of the predetermined device by constantly increasing the amount of power generation of a power generator for charging the storage battery.

According to (4) and (7), since the power required for the execution of the task is secured in accordance with details of a post-shutdown task, it is possible to inhibit an excessive amount of power generation of the power generator for charging the storage battery and to avoid a decrease in fuel consumption of the predetermined device.

According to (5), it is possible to update a control program of the predetermined device after a shutdown.

According to (6), since the occupant is not notified that the system will be updated until the storage battery is charged to the second target value, the occupant does not have to wait from the notification until a start of the update.

According to (9), since the storage battery checks for the presence of post-shutdown tasks while it is in a charged state, it is possible to avoid consuming the power of the storage battery.

DESCRIPTION OF EMBODIMENTS

Hereinafter, embodiments of a control system of the present invention will be described with reference to the drawings. In the following description, it is assumed that a power supply unit to be controlled by the control system supplies power to the control system applied to a vehicle (a vehicle system) that is an example of a predetermined device.

Figure 1:
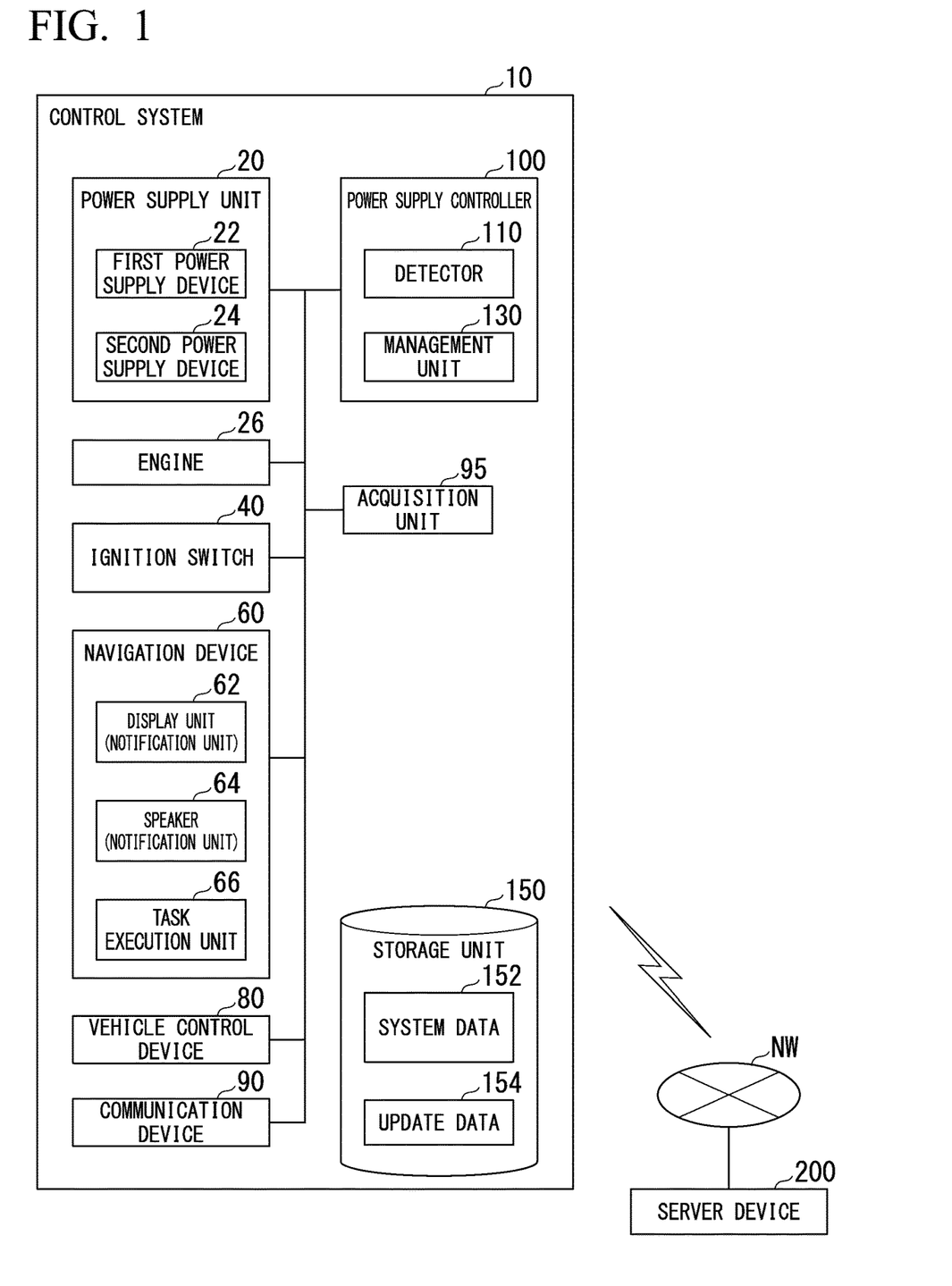
FIG. 1 is a diagram which shows a configuration of a control system 10 applied to a vehicle.

FIG. 1 is a diagram which shows a configuration of the control system 10 applied to a vehicle. The control system 10 communicates with a server device 200 via a network NW. The network NW includes the Internet, a wide area network (WAN), a local area network (LAN), a public line, a provider device, a dedicated line, a wireless base station, and the like.

[Control System 10]

A vehicle to which the control system 10 is applied is, for example, a vehicle with four or more wheels, but may also be a motorcycle or other vehicles. The control system 10 includes, for example, a power supply unit 20, an engine 26, an ignition switch 40, a navigation device 60, a vehicle control device 80, a communication device 90, a power supply controller 100, and an acquisition unit 95.

The power supply unit 20 includes, for example, a first power supply device 22 and a second power supply device 24. The first power supply device 22 is, for example, a storage battery, and supplies power to a vehicle and the power supply controller 100. The second power supply device 24 is, for example, a power generator (alternator) that generates power using electric power output by the engine 26. The second power supply device 24 supplies a power supply to a vehicle or supplies power for charging the first power supply device 22 after starting power generation.

In this case, the second power supply device 24 is mechanically coupled to an output shaft of the engine 26. The second power supply device 24 is driven to rotate in conjunction with a rotation of the output shaft, and outputs power. In addition, the second power supply device 24 may be used as a starter motor for starting the engine 26 or a starter motor may also be separately provided in addition to the second power supply device 24.

The ignition switch 40 is, for example, a switch for instructing starting and stopping of the engine 26. When the ignition switch 40 is turned off, the engine 26 stops and the second power supply device 24 stops generating power. At this time, an ON state of a so-called accessory power supply (ACC) is also released, and the vehicle is shut down (a state in which the vehicle is not able to be operated by operations of an occupant).

If the occupant (user) turns on the ignition switch 40 while the vehicle is stopped, the starter motor (not shown) performs cranking by causing the output shaft of the engine 26 to rotate and causes the engine 26 to start. The second power supply device 24 supplies power to the vehicle by starting power generation, and performs charging of the first power supply device 22 after the engine 26 is started.

If the occupant turns off the ignition switch 40 while the vehicle is started, the engine 26 stops, the second power supply device 24 stops, power supply to the vehicle stops, and the charging of the first power supply device 22 is stopped.

Incidentally, while the vehicle is shut down due to the off operation of turning off the ignition switch 40, when there is a post-shutdown task to be described below, at least the navigation device 60 (the task execution unit 66) does not completely stop and executes the post-shutdown task in the background. The navigation device 60 stops after executing the post-shutdown task.

The navigation device 60 includes, for example, a display unit 62, a speaker 64, and a task execution unit 66. For example, the navigation device 60 generates a route to a destination on the basis of a position of a vehicle, and guides an occupant on the route to the destination using the display unit 62, the speaker 64, or the like. A notification unit including the display unit 62 and the speaker 64 may be used to notify the occupant of information on the vehicle. The task execution unit 66 executes a post-shutdown task after a shutdown condition is satisfied. Note that the task execution unit 66 may also be provided in the vehicle control device 80 and the power supply controller 100.

The vehicle control device 80 controls the engine 26 and other devices related to a vehicle to perform control related to traveling of the vehicle.

The communication device 90 is, for example, a wireless communication module for connecting to the network NW. The communication device 90 performs wireless communication on the basis of Wi-Fi, dedicated short range communications (DSRC), and other communication standards.

The acquisition unit 95 acquires information on a post-shutdown task of an execution subject (the navigation device 60, the vehicle control device 80, or the power supply controller 100) that may execute a post-shutdown task to be executed after a shutdown condition of a vehicle is satisfied from the server device 200, at an arbitrary timing (when the control system 10 is started).

The execution subject is, for example, the navigation device 60, the vehicle control device 80, the power supply controller 100, and the like. The acquisition unit 95 communicates with the server device 200 via the communication device 90, acquires information on the post-shutdown task, and outputs information on a presence or absence of update data to a management unit 130 of the power supply controller 100.

The post-shutdown task is, for example, a task to update a control program that executes various types of computers mounted on a vehicle, parameters used for processing, and the like. In other words, the post-shutdown task includes a download and an update of software related to a vehicle system.

For example, the post-shutdown task corresponds to a control program that operates the navigation device 60, the vehicle control device 80, the power supply controller 100, and the like, and a task that updates the parameters used for processing. In the following description, it is assumed that the execution subject is the navigation device 60.

The post-shutdown task is a task that acquires update data of a control program of a predetermined device, a task that updates the control program of a predetermined device using the update data, a task that acquires parameters used for processing in the predetermined device, a task that updates the parameters used for processing in the predetermined device, or the like.

The post-shutdown task is executed after the shutdown condition is satisfied. It is determined that the shutdown condition is satisfied when the occupant performs an off operation of turning off the ignition switch 40.

The post-shutdown task includes, for example, a first task that performs a download and an update of software related to the vehicle system after the shutdown condition is satisfied, and a second task that perform the update of the software after the shutdown condition is satisfied as a post-shutdown task when the download of the software related to the vehicle system is performed before the shutdown condition is satisfied.

The acquisition unit 95 acquires information on a post-shutdown task from the server device 200. The acquisition unit 95 passes the acquired information on a post-shutdown task to the management unit 130.

The task execution unit 66 downloads the update data before the shutdown condition is satisfied, for example, at an arbitrary timing. For example, the acquisition unit 95 may download the update data after the shutdown condition is satisfied on the basis of an instruction of a management unit 130 to be described below.

The power supply controller 100 monitors the power supply unit 20, detects an output performance value of the power supply unit 20, and adjusts the output performance value. The output performance value is, for example, a state of charge (SOC) of the first power supply device 22. The output performance value is expressed using, for example, a remaining amount of charge [%] of the first power supply device 22. The output performance value may be a voltage, a temperature, or other values. In the following description, the output performance value may be set to an SOC.

The power supply controller 100 includes a detector 110 and a management unit 130. These components of the power supply controller 100, the task execution unit 66, and the acquisition unit 95 are realized, for example, by a hardware processor such as a central processing unit (CPU) executing a program (software). In addition, some or all of these components may be realized by hardware (a circuit unit; including circuitry) such as a large scale integration (LSI), an application specific integrated circuit (ASIC), a field-programmable gate array (FPGA), or a graphics processing unit (GPU), or may be realized by cooperation of software and hardware.

The detector 110 monitors the power supply unit 20 and detects an SOC of the first power supply device 22 of the power supply unit 20.

The management unit 130 adjusts an output of the power supply unit 20 on the basis of the output performance value of the power supply unit 20, which is detected by the detector 110. The management unit 130 adjusts the SOC of the first power supply device 22 of the power supply unit 20, for example, during an operation of the engine 26. The management unit 130 adjusts an amount of power generation of the second power supply device 24 and adjusts an amount of power supply of the second power supply device 24, thereby adjusting the SOC of the first power supply device 22.

The management unit 130 adjusts a target value of the SOC of the first power supply device 22 such that it converges to a first target value. The first target value may be a predetermined range having a certain range. When the power required by a vehicle has exceeded a capacity of the second power supply device 24, insufficient power is supplied from the first power supply device 22. After the first power supply device 22 compensates for the insufficient power, the management unit 130 adjusts the SOC of the first power supply device 22 to the first target value again.

The first target value is, for example, determined such that power required for starting the engine 26 again (starting the vehicle) remains after the vehicle has stopped completely. The power required at the time of starting the engine 26 again includes, for example, power for driving the starter motor and power for starting the vehicle control device 80. The first target value is set without excess or deficiency so as not to reduce fuel consumption of the vehicle and to enable starting of the engine 26.

Here, although when the post-shutdown task is executed, since power required for execution of the post-shutdown task is used from the time of turning off the ignition, the power for driving the starter motor and the power for starting the vehicle control device 80 described above may be insufficient for restarting. Therefore, when the execution of the post-shutdown task is controlled by the "first target value" set when the execution of the post-shutdown task described above is not scheduled, required power may not be left in the first power supply device 22 when the engine 26 is started next time.

Therefore, in the present invention, the management unit 130 determines whether there is a post-shutdown task on the basis of the information acquired by the acquisition unit 95, and, when it is determined that there is a post-shutdown task, it adjusts the SOC of the power supply unit 20, and adjusts the SOC to a value higher than when there is no post-shutdown task by setting the second target value as the target value.

The acquisition unit 95 accesses the server device 200 according to a predetermined schedule, acquires information related to the post-shutdown task, and checks the presence or absence of update data during power generation of the second power supply device 24 after the vehicle is started.

For example, when it is determined that there is a post-shutdown task, the management unit 130 sets the SOC of the power supply unit 20 to a threshold value required for a start of the vehicle and the execution of the post-shutdown task or greater by setting the second target value as the target value.

In addition, the management unit 130 may also set the second target value to a different value on the basis of details of the post-shutdown task scheduled to be executed after the shutdown condition of the vehicle is satisfied. For example, when it is determined that there is the first task as the post-shutdown task, the management unit 130 sets the SOC of the first power supply device 22 to a second target value of a first value that is higher than the first target value. The second target value of the first value is set to, for example, a value at which power required for starting the vehicle is left in the first power supply device 22 even after the first task is executed. The second target value of the first value is set to 98[%], for example, when the first target value is set to 90[%] when there is no post-shutdown task. The management unit 130 causes the second power supply device 24 to charge the first power supply device 22 such that the SOC of the first power supply device 22 becomes the second target value of the first value.

In addition, for example, when it is determined that there is the second task described above as a post-shutdown task, the management unit 130 sets the SOC of the first power supply device 22 to a second target value of a second value which is lower than the second target value of the first value when there is the first task because the second task has less processing content than the first task. The second target value of the second value is set to, for example, 95[%] when the first target value when there is no post-shutdown task is set to 90[%]. The management unit 130 caused the second power supply device 24 to charge the first power supply device 22 such that the SOC of the first power supply device 22 becomes the second target value of the second value. In addition, as in the example described above, the post-shutdown task may set different second target values on the basis of details of the task that performs a download of software related to the vehicle system and the task that perform an installation thereof. In addition, different second target values may be set on the basis of the number of devices that execute the post-shutdown task. In this case, the number of devices that execute the post-shutdown task, that is, the number of devices that execute the download or installation of software after shutdown, is detected, and, as the number increases, the second target value of the second value, a larger second target value of the first value, and further larger second target values of a third value and a fourth value may be set.

The management unit 130 may predict a time or point at which the shutdown condition is satisfied on the basis of route information generated by the navigation device 60. The point at which the shutdown condition is satisfied is, for example, a destination set in the navigation device 60.

Alternatively, the management unit 130 may predict the point at which the shutdown condition is satisfied on the basis of a boarding pattern of the occupant. The point at which the shutdown condition is satisfied is, for example, a point of the occupant's home, workplace, or the like at which parking of a vehicle for a long time is repeated several times after the vehicle stops. If the point at which the shutdown condition is satisfied is determined, time taken to arrive at the point or an arrival time can be predicted on the basis of a distance away from the position of the vehicle. The management unit 130 uses the predicted arrival time for control.

Figure 2:
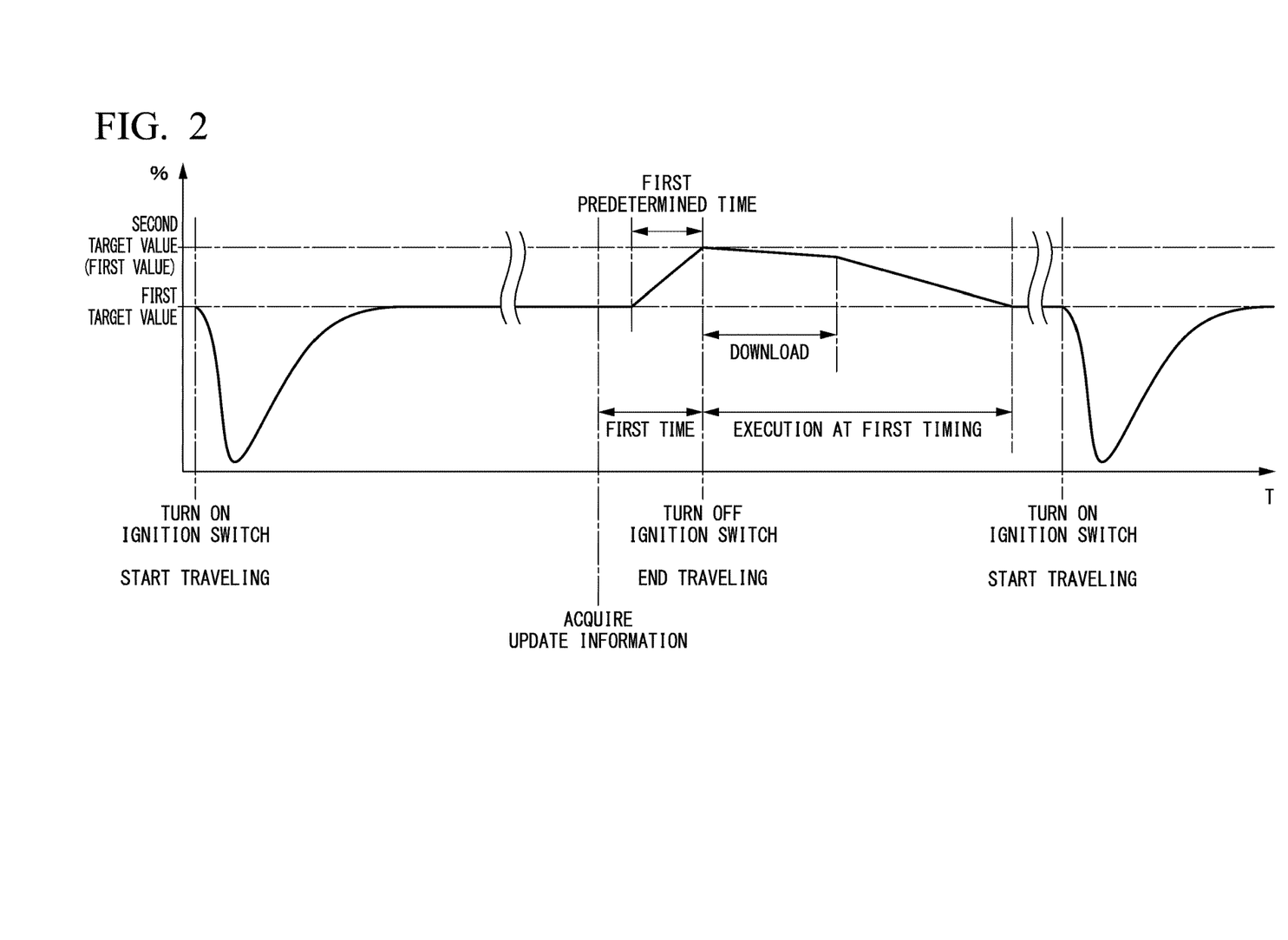
FIG. 2 is a diagram which shows an example of processing of the control system 10.

FIG. 2 is a diagram which shows an example of processing of the power supply controller 100. The management unit 130 calculates first time from a current time to performance of a shutdown operation on the basis of a satisfying condition of the shutdown condition when information related to the post-shutdown task is acquired. When it is determined that update data cannot be downloaded during the calculated first time, the management unit 130 determines a first schedule for the first task to be executed after the download of update data is shutdown.

When the management unit 130 executes the first task to be executed after the download of update data is shut down on the basis of the first schedule, and when the vehicle as a moving object is present at a position of a first predetermined time or a first predetermined distance away from a predicted time or point to the destination, the management unit 130 starts control to increase the SOC of the first power supply device 22 to the second target value of the first value for the first task, and sets the SOC of the first power supply device 22 to the second target value of the first value during the first predetermined time until the vehicle arrives at the destination. As described above, according to the control system 10, based on a condition that the vehicle is present at the position of the first predetermined time or the first predetermined distance away from the predicted time or point to the destination, it is possible to increase a fuel consumption efficiency of the vehicle before the vehicle is present at the position of the first predetermined time or the first predetermined distance by starting the control to increase the SOC of the first power supply device 22 to the second target value of the first value for the first task.

As shown in FIG. 2, power required when the vehicle starts is secured even after the post-shutdown task is executed by setting the SOC of the first power supply device 22 to the second target value of the first value.

Figure 3:
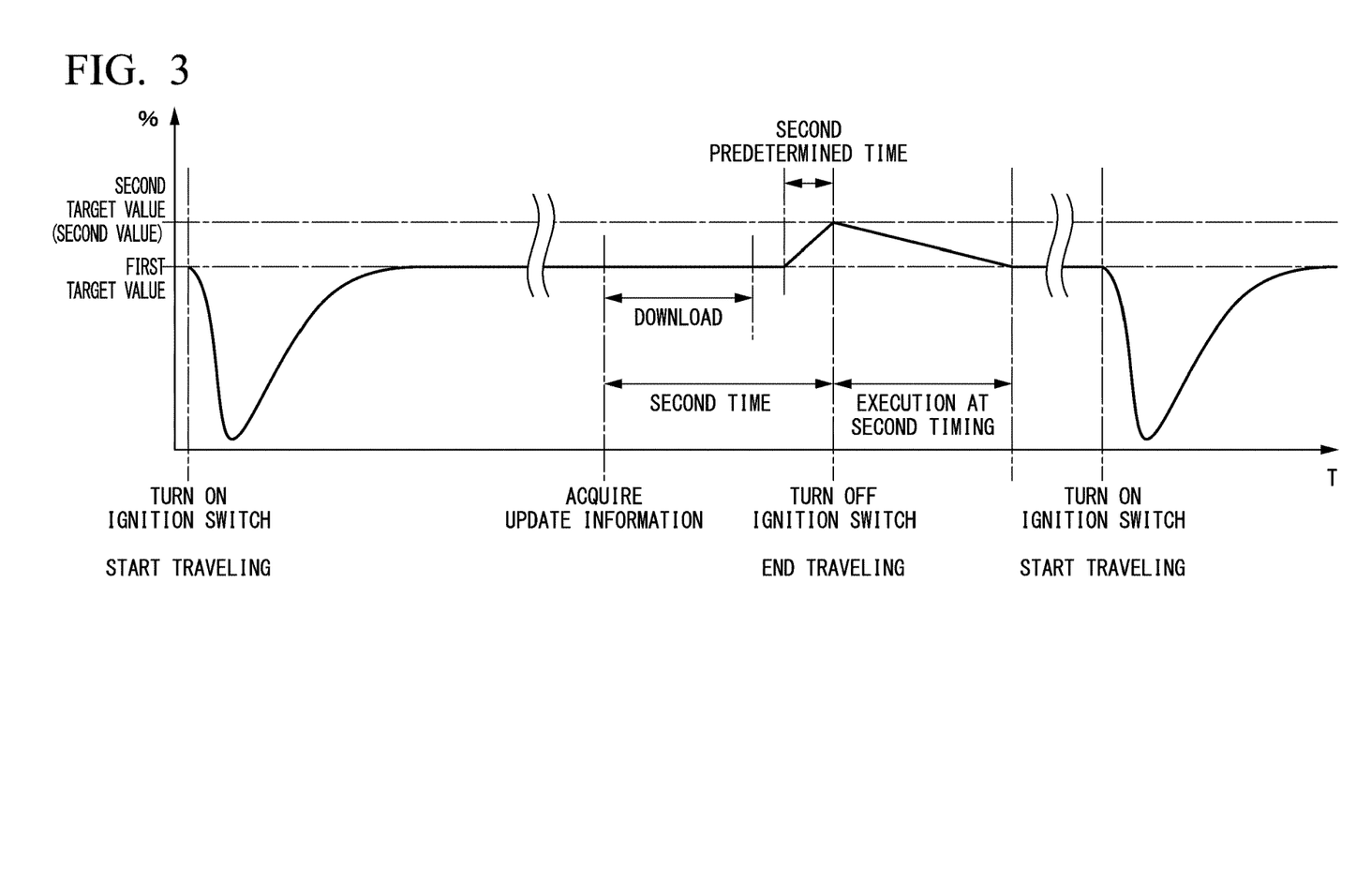
FIG. 3 is a diagram which shows an example of another type of processing of the control system 10.

FIG. 3 is a diagram which shows an example of another type of processing of the control system 100. When the management unit 130 acquires the information related to a post-shutdown task, the management unit 130 calculates a second time from a current time to a time at which the shutdown operation is performed on the basis of the satisfying condition of the shutdown condition. The management unit 130 determines a second schedule for the second task to be executed before the download of update data is shut down when it is determined that the update data can be downloaded during the calculated second time.

When the management unit 130 executes the second task, which is a post-shutdown task when the download of update data is executed before the shutdown, after the shutdown on the basis of the second schedule, and when a moving vehicle is present at a position of a second predetermined time or a second predetermined distance away from the predicted time or point to the destination, the management unit 130 starts control to increase the SOC of the first power supply device 22 to the second target value of the second value for the second task and sets the SOC of the first power supply device 22 to the second target value of the second value during the second predetermined time. As described above, according to the control system 10, based on a condition that the vehicle is present at a position of the second predetermined time or the second predetermined distance away from the predicted time or point to the destination, it is possible to increase the fuel consumption efficiency of the vehicle before the vehicle is present at the position of the second predetermined time or the second predetermined distance by starting the control to increase the SOC of the first power supply device 22 to the second target value of the second value for the second task.

As shown in FIG. 3, the SOC of the first power supply device 22 is set to the second target value of the second value, and thereby the power required when the vehicle starts is secured even after the task is executed after the download.

When update data is checked, the management unit 130 determines whether the SOC of the first power supply device 22 is the second target value without notifying the occupant that the system is updated at that time, and, if it is determined that the SOC of the first power supply device 22 reaches the second target value, it displays information indicating that an update of the system is performed on the display unit 62 and notifies the occupant of the update of the system. This notification may be set as a condition that the SOC of the first power supply device 22 has actually reached the second target value. Note that the information indicating that the update of the system is performed may also be output to the occupant using voice from the speaker 64.

[Server Device]

The server device 200 provides update data via the network NW. The server device 200 includes a network interface card (NIC) for connecting to the network NW. The server device 200 uploads the update data at an arbitrary timing.

[Storage Unit]

The storage unit 150 stores system data 152 including software and data related to a vehicle system. In addition, the storage unit 150 stores update data 154 for updating the system data 152. The storage unit 150 is realized by a hard disk drive (HDD), a flash memory, a random access memory (RAM), a read only memory (ROM), and the like.

[Processing Flow]

Figure 4:
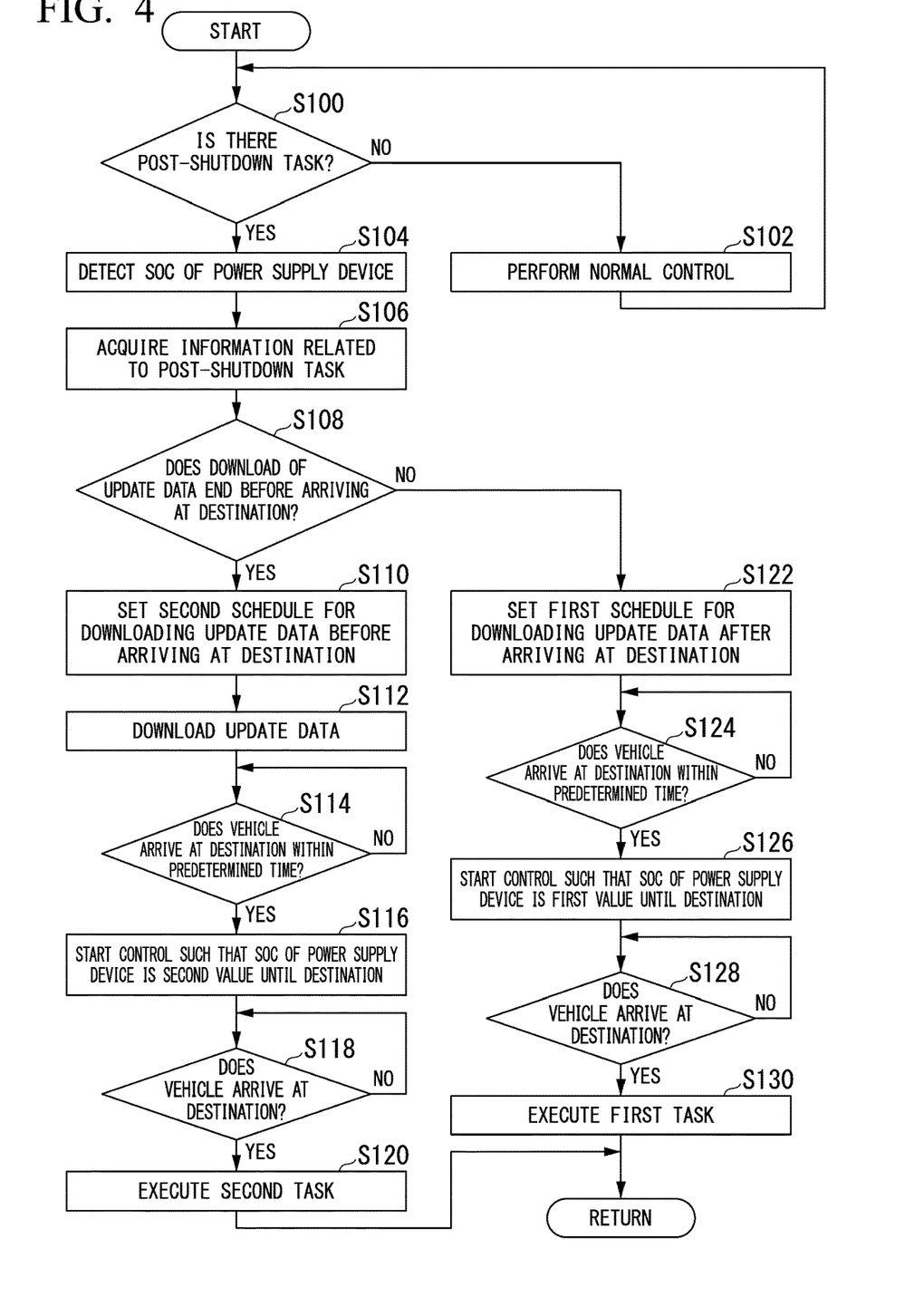
FIG. 4 is a flowchart which shows a flow of the processing of the control system 10.

Next, a flow of processing of the power supply controller 100 will be described. FIG. 4 is a flowchart which shows the flow of the processing of the power supply controller 100.

The management unit 130 determines whether there is a post-shutdown task on the basis of information on the post-shutdown task acquired by the acquisition unit 95 (step S100). The management unit 130 performs normal control when it is determined that there are no post-shutdown tasks (step S102).

When it is determined that there is a post-shutdown task by the management unit 130, the detector 110 detects the SOC that is an output performance value of the first power supply device 22 of the power supply unit 20 (step S104). The acquisition unit 95 accesses the server device 200 and acquires information on update data related to a post-shutdown task (step S106). The management unit 130 determines whether the download of the update data ends until the vehicle arrives at the destination on the basis of the information acquired by the acquisition unit 95 (step S108).

When the management unit 130 determines that the download of the update data ends until the vehicle arrives at the destination, it determines a second schedule for downloading the update data until the vehicle arrives at the destination (step S110). The management unit 130 causes the task execution unit 66 to download the update data (step S112). The management unit 130 determines whether the vehicle has arrived at the position of the second predetermined time or the second predetermined distance to the destination (step S114).

When the management unit 130 determines that the vehicle has arrived at the position of the second predetermined time or the second predetermined distance to the destination, it sets the target value of the SOC of the first power supply device 22 of the power supply unit 20 to the second target value of the second value, and starts control such that the SOC of the first power supply device 22 of the power supply unit 20 is directed to the second target value of the second value (step S116). The management unit 130 determines whether the vehicle has arrived at the destination (step S118). When the management unit 130 determines that the vehicle has arrived at the destination, it causes the task execution unit 66 to execute the second task after the off operation by the occupant (step S120).

When the management unit 130 determines that the download of the update data does not end until the vehicle arrives at the destination in step S108, it sets a first schedule for downloading the update data after the vehicle arrives at the destination (step S122). The management unit 130 determines whether the vehicle has arrived at the position of the first predetermined time or the first predetermined distance to the destination (step S124). When the management unit 130 determines that the vehicle has arrived at the position of the first predetermined time or the first predetermined distance to the destination, it sets the target value of the SOC of the first power supply device 22 of the power supply unit 20 to the second target value of the first value, and starts the control such that the SOC of the first power supply device 22 of the power supply unit 20 is directed to the second target value of the first value (step S126).

The management unit 130 determines whether the vehicle has arrived at the destination (step S128). When the management unit 130 determines that the vehicle has arrived at the destination, it causes the task execution unit 66 to execute the first task after the off operation by the occupant (step S130).

According to the embodiment described as above, even when there is a task to be executed after the vehicle is shut down, the power supply control system 1 can secure the power required for the execution of the task. In this manner, the power supply control system 1 can avoid an increase in size of the first power supply device 22 for the power required for the execution of the task, and can avoid a decrease in fuel consumption of the vehicle by constantly increasing the amount of power generation. At this time, since the power supply control system 1 causes the SOC of the first power supply device 22 to increase in accordance with the details of a post-shutdown task, it can avoid a decrease in fuel consumption of the vehicle caused by constantly increasing the excessive amount of power generation.

In addition, since the control system 10 does not notify the occupant that the system will be updated until the first power supply device 22 is charged to the second target value, the occupant does not have to wait after the notification of the update of the system until a start of the update. Moreover, since the control system 10 changes a timing at which update data is downloaded in accordance with a usage status of the vehicle of a user, it can reduce a load of the server device 200 that provides update data. In this manner, the control system 10 can distribute a load of a line accessed by the server device 200 and avoid an increase in time for downloading the update data.

Moreover, since a randomness of a timing to connect to the server device 200 for downloading update data is secured in the control system 10, measures for load distribution of the server device 200 in the server device 200 or the vehicle can be unnecessary.

Figure 5:
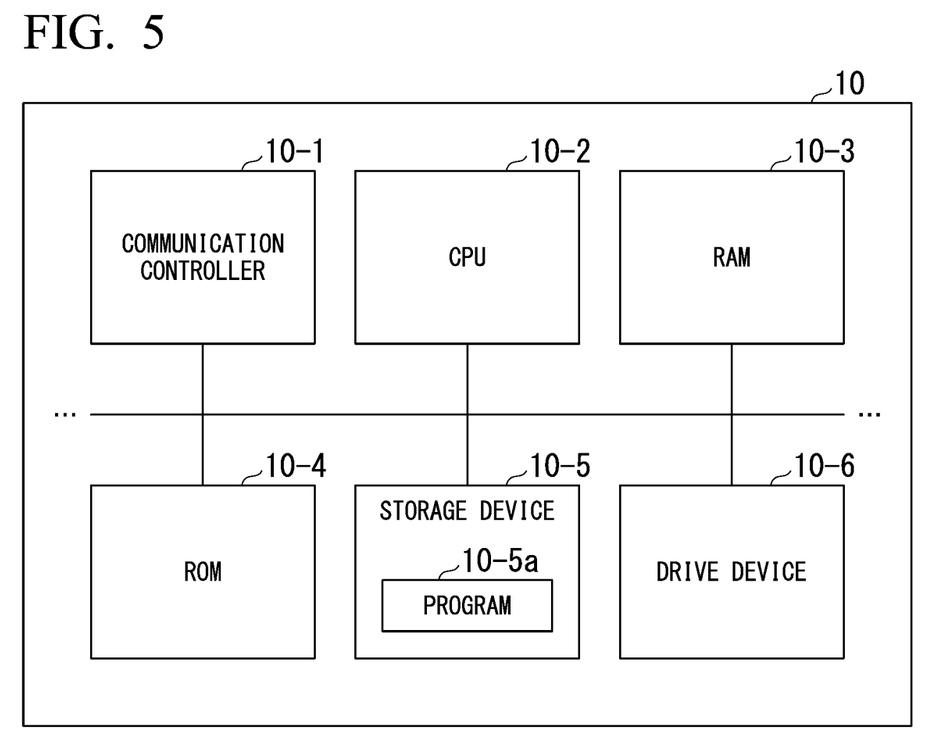
FIG. 5 is a diagram which shows a plurality of constituents which can be used in the control system 10.

The embodiment described above can be expressed as follows. FIG. 5 is a diagram which shows a plurality of constituents which can be used in the control system 10. The control system 10 is configured by a communication controller 10-1, a CPU 10-2, a RAM 10-3 used as a working memory, a ROM 10-4 for storing a boot program, a storage device 10-5 such as a flash memory or an HDD, a drive device 10-6, and the like being connected to each other via an internal bus or a dedicated communication line.

The communication controller 10-1 communicates with components other than the control system 10 shown in FIG. 1. The storage device 100-5 stores a program 10-5a that is executed by the CPU 10-2. This program is expanded in the RAM 10-3 by a direct memory access (DMA) controller (not shown) or the like, and is executed by the CPU 10-2. As a result, a part or all of the task execution unit 66, the acquisition unit 95, the detector 110, and the management unit 130 are realized.

The embodiment described above can be expressed as follows.

A control system includes a hardware processor, and a storage device, in which the storage device stores a program which causes the hardware processor to control a power supply device toward a target value for an output performance value of the power supply device that supplies power to a predetermined device, to acquire information related to a post-shutdown task scheduled to be executed after a shutdown condition of the predetermined device is satisfied, and to refer to the acquired information, and, when the post-shutdown task is scheduled to be executed, to set the target value to a second target value which is higher than a first target value set when the post-shutdown task is scheduled to be executed, before the shutdown condition is satisfied.

As described above, a mode for implementing the present invention has been described using the embodiment, but the present invention is not limited to such embodiment at all, and various changes and substitutions can be added within a range not departing from the gist of the present invention. For example, the present invention can be applied to moving objects other than vehicles. In addition, when a storage medium in which update data of the navigation device 60 or the like is stored is set by the occupant, the management unit 130 may determine that there is a post-shutdown task of the navigation device 60 or the like by detecting the storage medium.

REFERENCE SIGNS LIST

10 Control system
10-1 Communication controller
10-5 Storage device
10-5a Program
10-6 Drive device
110 Detector
130 Management unit
150 Storage unit
152 System data
154 Update data
200 Server device
CPU100-2 Communication controller
20 First power supply device
22 Storage battery
24 Second power supply device
26 Engine
40 Ignition switch
60 Navigation device
62 Display unit
64 Speaker
66 Task execution unit
80 Vehicle control device
90 Communication device
95 Acquisition unit
100 Power supply controller

What is claim is:

1. A control system comprising:
a management unit configured to control a power supply device toward a target value for an output performance value of the power supply device that supplies power to a predetermined device; and
an acquisition unit configured to acquire information related to a post-shutdown task scheduled to be executed after a shutdown condition of the predetermined device is satisfied,
wherein the management unit refers to the information acquired by the acquisition unit, and, when the post-shutdown task is scheduled to be executed, sets the target value to a second target value which is higher than a first target value set when the post-shutdown task is not scheduled to be executed, before the shutdown condition is satisfied, and
wherein the management unit predicts a time or point at which the shutdown condition of the predetermined device as a moving object is satisfied, and sets, when the predetermined device is present at a position of a predetermined time or a predetermined distance from the predicted time or point, the target value to the second target value.

2. The control system according to claim 1, further comprising:
a task execution unit configured to execute the post-shutdown task when the output performance value of the power supply device reaches the second target value at a time at which the shutdown condition of the predetermined device is satisfied.

3. The control system according to claim 1,
wherein the management unit sets different second target values on the basis of content of the post-shutdown task scheduled to be executed after the shutdown condition of the predetermined device is satisfied.

4. The control system according to claim 1,
wherein the post-shutdown task is a task including at least one of a task that acquires update data of a control program of the predetermined device, a task that updates the control program of the predetermined device using the update data, a task that acquires parameters used for processing in the predetermined device, and a task that updates the parameters used for the processing in the predetermined device.

5. The control system according to claim 4, further comprising:
a notification unit configured to notify a user of the predetermined device that the post-shutdown task is executed when the output performance value has reached the second target value.

6. The control system according to claim 4,
wherein, when the post-shutdown task is a task that acquires the update data using the acquisition unit and updates the control program based on the update data, the management unit sets the output performance value of the power supply device to a first value as the second target value, and sets the output performance value to a second value which is lower than the first value as the second target value when the post-shutdown task is a task that updates the control program based on the update data without acquiring the update data using the acquisition unit.

7. The control system according to claim 1,
wherein the predetermined device is a moving object including a vehicle.

8. The control system according to claim 1,
wherein the acquisition unit acquires the information while a second power supply device different from the power supply device performs power supply to the predetermined device, and
the second power supply device stops the power supply to the predetermined device after the shutdown condition of the predetermined device is satisfied.

9. A control system comprising:
a management unit configured to control a power supply device toward a target value for an output performance value of the power supply device that supplies power to a predetermined device; and
an acquisition unit configured to acquire information related to a post-shutdown task scheduled to be executed after a shutdown condition of the predetermined device is satisfied,
wherein the management unit refers to the information acquired by the acquisition unit, and, when the post-shutdown task is scheduled to be executed, sets the target value to a second target value which is higher than a first target value set when the post-shutdown task is not scheduled to be executed, before the shutdown condition is satisfied,
a notification unit configured to notify a user of the predetermined device that the post-shutdown task is executed,
wherein the management unit refers to the information acquired by the acquisition unit, sets, when it is checked that the post-shutdown task is scheduled to be executed, the target value to the second target value which is higher than the first target value set when the post-shutdown task is not scheduled to be executed, before the shutdown condition is satisfied, and
determines at least one of that the output performance value reaches the second target value and that the output performance value has reached the second target value, and
the notification unit does not notify that the post-shutdown task will be executed at a time at which it is checked that the post-shutdown task is scheduled to be executed, and notifies that the post-shutdown task will be executed when the management unit determines that the target value reaches or has reached the second target value.

10. A control system comprising:
a management unit configured to control a power supply device toward a target value for an output performance value of the power supply device that supplies power to a predetermined device; and
an acquisition unit configured to acquire information related to a post-shutdown task scheduled to be executed after a shutdown condition of the predetermined device is satisfied,
wherein the management unit refers to the information acquired by the acquisition unit, and, when the post-shutdown task is scheduled to be executed, sets the target value to a second target value which is higher than a first target value set when the post-shutdown task is not scheduled to be executed, before the shutdown condition is satisfied,
wherein the predetermined device is a moving object including a vehicle, and
wherein the management unit sets the output performance value of the power supply device to a first value as the second target value when the post-shutdown task is a first task which is a task that acquires update data of the control program of the predetermined device using the acquisition unit and updates the control program based on the update data,
sets the output performance value to a second value which is lower than the first value as the second target value when the post-shutdown task is a second task which is a task that updates the control program based on the update data without acquiring the update data using the acquisition unit,
determines whether acquisition of the update data will end before the vehicle arrives at a destination on the basis of the information acquired by the acquisition unit,
sets the first task as the post-shutdown task when it is determined that the acquisition of the update data will not end before the vehicle arrives at the destination, and
sets the second task as the post-shutdown task when it is determined that the acquisition of the update data will end before the vehicle arrives at the destination.

11. A control method comprising:
by a computer,
controlling a power supply device toward a target value for an output performance value of the power supply device that supplies power to a predetermined device;
acquiring information related to a post-shutdown task scheduled to be executed after a shutdown condition of the predetermined device is satisfied;
referring to the acquired information and, when the post-shutdown task is scheduled to be executed, setting the target value to a second target value which is higher than a first target value set when the post-shutdown task is not scheduled to be executed, before the shutdown condition is satisfied; and
predicting a time or point at which the shutdown condition of the predetermined device as a moving object is satisfied, and setting, when the predetermined device is present at a position of a predetermined time or a predetermined distance from the predicted time or point, the target value to the second target value.

12. A non-transitory computer-readable storage medium storing a program which causes a computer to:
control a power supply device toward a target value for an output performance value of the power supply device that supplies power to a predetermined device;
acquire information related to a post-shutdown task scheduled to be executed after a shutdown condition of the predetermined device is satisfied;
refer to the acquired information and, when the post-shutdown task is scheduled to be executed, set the target value to a second target value which is higher than a first target value set when the post-shutdown task is not scheduled to be executed, before the shutdown condition is satisfied;
predict a time or point at which the shutdown condition of the predetermined device as a moving object is satisfied; and
set, when the predetermined device is present at a position of a predetermined time or a predetermined distance from the predicted time or point, the target value to the second target value.

* * * * *